(12) United States Patent
Miller et al.

(10) Patent No.: US 11,024,916 B2
(45) Date of Patent: Jun. 1, 2021

(54) STRING TRIMMER BATTERY HOUSING ASSEMBLY

(71) Applicant: STANLEY BLACK & DECKER, INC., Middle River, MD (US)

(72) Inventors: Mark D Miller, Towson, MD (US); Brian Poole, Lutherville Timonium, MD (US); John Palermo, Towson, MD (US); Michael Cannaliato, Bel Air, MD (US); Robert B Schoch, Towson, MD (US)

(73) Assignee: Stanley Black & Decker, Inc., New Britain, CT (US)

( * ) Notice: Subject to any disclaimer, the term of this patent is extended or adjusted under 35 U.S.C. 154(b) by 39 days.

(21) Appl. No.: 16/249,399

(22) Filed: Jan. 16, 2019

(65) Prior Publication Data
US 2019/0148684 A1 May 16, 2019

Related U.S. Application Data

(63) Continuation of application No. 14/713,411, filed on May 15, 2015, now Pat. No. 10,224,524.

(51) Int. Cl.
| | |
|---|---|
| *H01M 50/20* | (2021.01) |
| *H01M 50/24* | (2021.01) |
| *A01D 34/416* | (2006.01) |
| *A01D 34/82* | (2006.01) |
| *A01D 34/78* | (2006.01) |
| *B25F 5/00* | (2006.01) |

(52) U.S. Cl.
CPC .......... *H01M 50/20* (2021.01); *A01D 34/416* (2013.01); *A01D 34/78* (2013.01); *A01D 34/828* (2013.01); *B25F 5/00* (2013.01); *H01M 50/24* (2021.01); *H01M 2220/30* (2013.01)

(58) Field of Classification Search
CPC .................................................... A01D 34/416
See application file for complete search history.

(56) References Cited

U.S. PATENT DOCUMENTS

| | | | | | |
|---|---|---|---|---|---|
| 5,265,341 | A | * | 11/1993 | Kikuchi | A01D 34/902 30/276 |
| 2007/0068008 | A1 | * | 3/2007 | Wu | A01D 34/902 30/276 |
| 2013/0164587 | A1 | * | 6/2013 | Smith | H01M 2/1061 429/97 |
| 2015/0013172 | A1 | * | 1/2015 | Shaffer | H02K 5/08 30/276 |

OTHER PUBLICATIONS

Definitions16249399 (Year: 2020).*

* cited by examiner

*Primary Examiner* — Brian R Ohara
(74) *Attorney, Agent, or Firm* — John Yun

(57) ABSTRACT

The battery housing assembly, connected to a support shaft assembly of a string trimmer, includes a base housing member defining a chamber configured to receive a battery therein. The base housing member includes a frontal member configured to engage a front of the battery, a top member extending from the frontal member, configured to engage the top portion of the battery, and a bottom member, configured to engage a bottom portion of the battery. A first side member is configured to be removably connected to a first side of the base housing member; and a second side member configured to be removably connected to a second side of the base housing member.

14 Claims, 13 Drawing Sheets

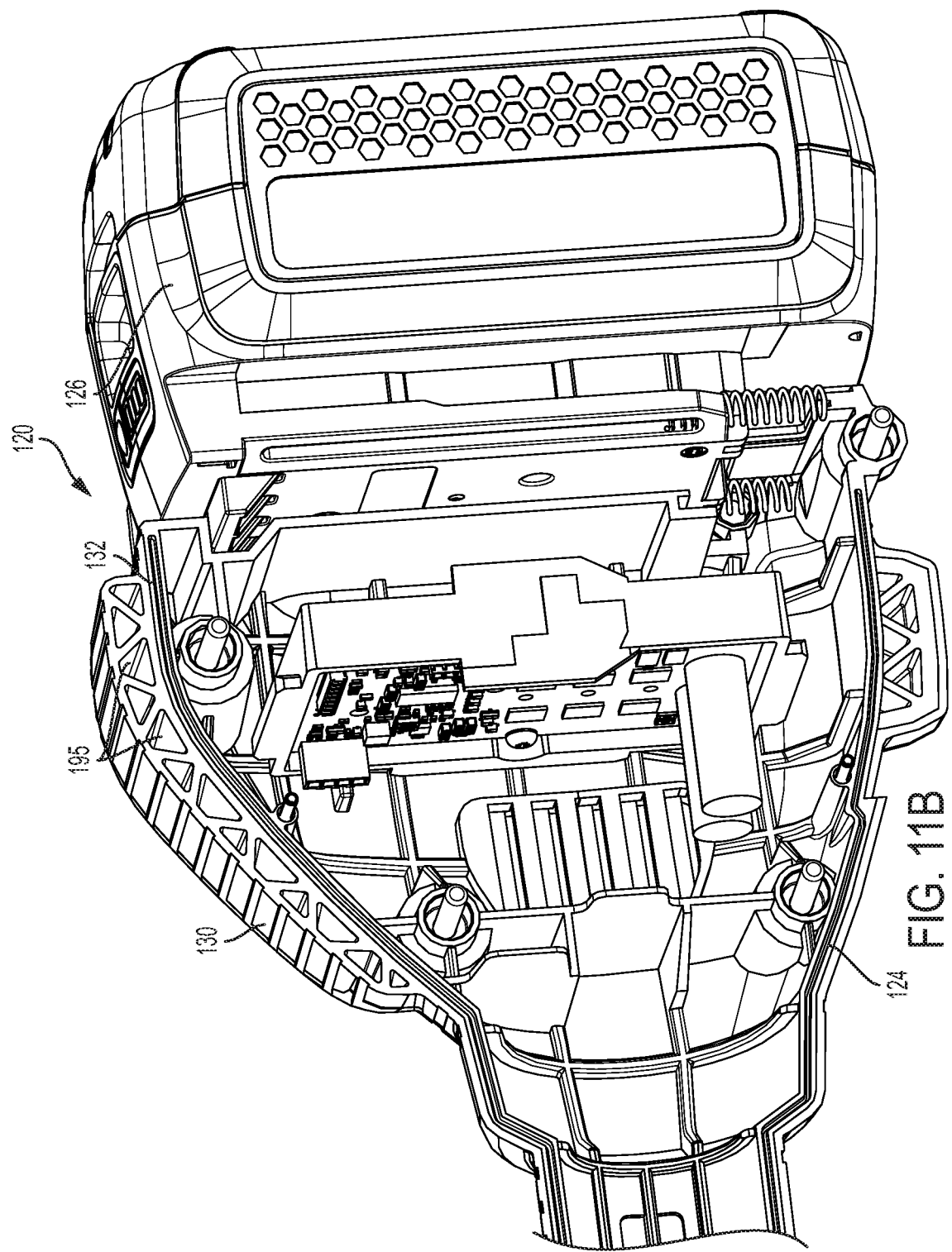

STRING TRIMMER BATTERY HOUSING ASSEMBLY

The present application is a continuation of U.S. patent application Ser. No. 14/713,411, filed May 15, 2015, entitled "String Trimmer Battery Housing Assembly", which is hereby incorporated by reference in its entirety.

TECHNICAL FIELD

The present invention relates to a battery-powered string trimmer. More particularly, the invention relates to a battery-powered string trimmer having a battery housing assembly, configured to protect the battery from impacts and permit easy storage.

Conventional string trimmers are generally used for horizontal trimming and vertical edging of lawn. Typically, string trimmers include a handle, a motor, a power source, and an elongated shaft and a lower cutting head from which the string cutting element extends and rotates to cut grass, weeds, and other vegetation. String trimmers may be powered by combustible fuel engines or electric motors. The versions driven by electric motors may be connected to a line source such as 120 volt alternating current electric power, or they may be powered by a battery pack or other source of direct current electrical power.

Most battery-powered string trimmers conventionally have a motor provided at a lower end of the elongated shaft and are actuated by a trigger provided in the handle assembly. Some conventional battery-powered string trimmers provide the battery in conjunction with the handle assembly, as a unitary system, while other string trimmers provide the battery at the opposing end portion of the elongated support shaft. In both of these configurations, the battery and/or housing is susceptible to damage if dropped on a surface.

In general, batteries used to power handheld devices, such as the string trimmer, are relatively heavy, as well as expensive. As such, during operation, the overall weight of the battery may on occasion cause the user to accidentally drop the battery end of the string trimmer, causing the battery housing to forcibly impact a surrounding surface. The overall weight of the battery, and thus force of the impact, may cause damage to the housing of the string trimmer, and/or to the battery itself.

Most string trimmers on the market do not provide a battery housing assembly configured to adequately protect the battery, and withstand a forceful impact with a hard surface, such as the ground or concrete. Further, most battery housing assemblies do not provide a battery housing assembly that facilitates the string trimmer to be mounted or stored in generally horizontal, as well as vertical position.

SUMMARY

In light of the present need for a string trimmer with a protective battery housing assembly, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

The battery housing assembly, connected to a support shaft assembly of a string trimmer, includes a base housing member defining a chamber configured to receive a battery therein. The base housing member includes a frontal member configured to engage a front of the battery, a top member extending from the frontal member and configured to engage the top portion of the battery, and a bottom member, configured to engage a bottom portion of the battery.

A first support bracket extends between the top member and bottom member on a first side of the base housing and a second support bracket extends between the top member and bottom member on an opposing second side of the base housing. A first side member is configured to be removably connected to a first side of the base housing, and a second side member is configured to be removably connected to a second side of the base member housing.

In an embodiment of the battery housing assembly, the base housing member, frontal member, and bottom member define a generally rectangular-shaped chamber configured to receive a battery therein.

In an embodiment of the battery housing assembly, the top member of the base housing includes a first groove member and a second groove member configured to engage a top portion of the battery therein, to facilitate fastening of the battery within the base housing member.

In an embodiment of the battery housing assembly, the top member of the base housing provides a latch member configured to selectively engage a top portion of an inserted battery to facilitate securing the battery within the battery housing.

In an embodiment of the battery housing assembly, the top portion of the base housing has a composite rubber exterior to absorb impacts and the first side member and second side member are comprised of a resilient material to absorb impacts.

In an embodiment of the battery housing assembly, each side member has a first projection and second projection, such that in a connect position, each of the respective first projection and second projection extend beyond the outer edge of the base housing member.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Most string trimmers are configured with an elongated shaft configuration. The elongated configuration has several key components provided across an extended distance, which makes it difficult for a user to fully protect the components at all times. For example, components at the end of the string trimmer opposite the cutting head, such as the battery, may extend beyond the user's body resulting in a greater chance that those components may strike obstacles resulting in damage. Also, damage may occur when the string trimmer is dropped. The elongated configuration of the shaft of the string trimmer also limits the options to mount or store the string trimmer after use. Further, most string trimmer batteries are relatively heavy and expensive and would be damaged in the event of a large impact.

Accordingly, it is desirable to provide a string trimmer assembly having a protective battery housing assembly configured to protect the battery from impact. It is further desirable to provide a removably attachable skid plate, configured to provide a buffer for the string trimmer when stored in a horizontal manner, and a hook permitting the string trimmer to be hung in a vertical manner.

The foregoing advantages of the invention are illustrative of those that can be achieved by the various exemplary embodiments and are not intended to be exhaustive or limiting of the possible advantages which can be realized. Thus, these and other advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

Figure 1:
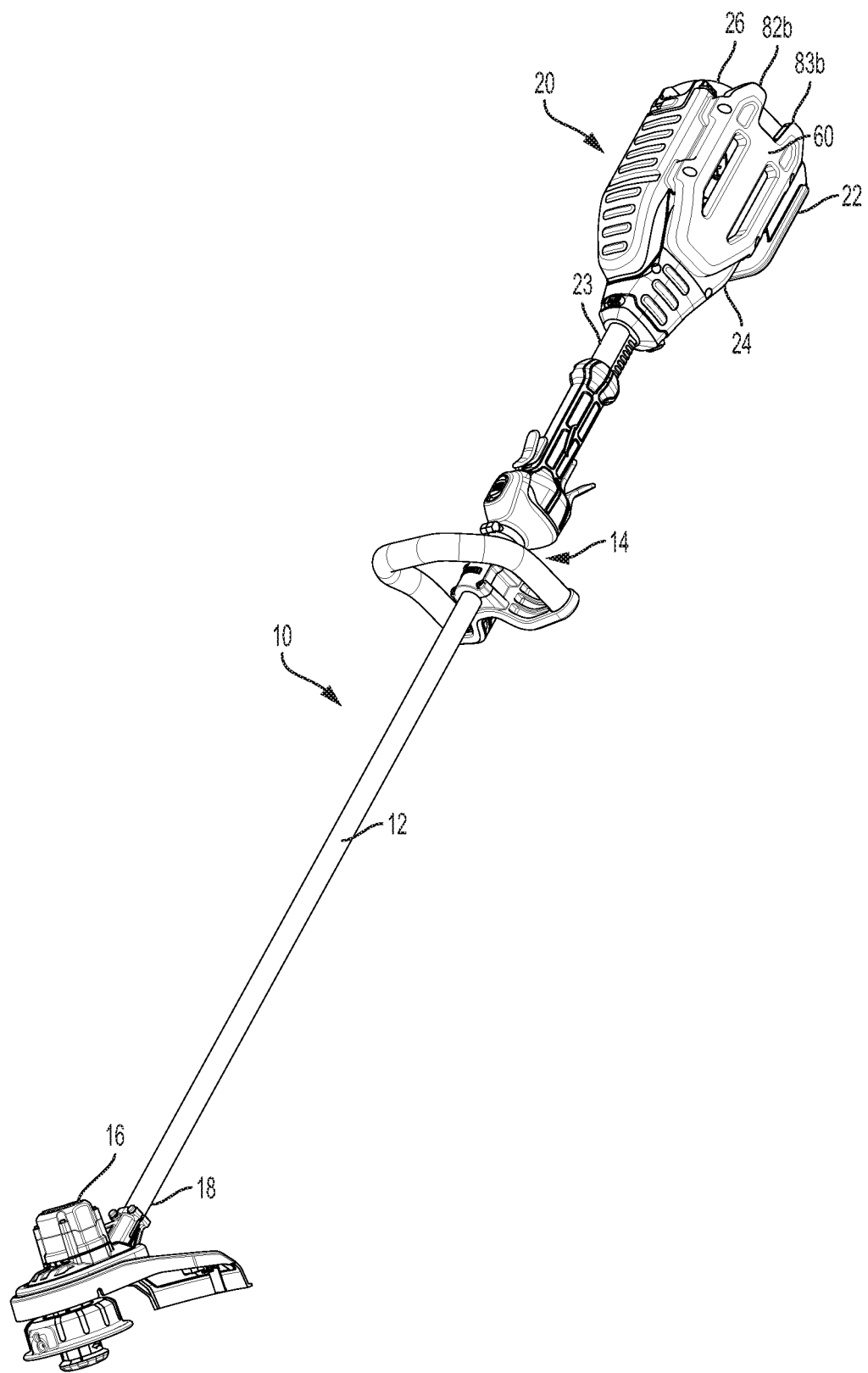
FIG. 1 is an environmental perspective view of a string trimmer having a protective battery housing assembly with a skid plate assembly attached thereto.

The battery housing assembly and skid plate assembly for the string trimmer, are configured to securely encase a conventional battery unit, protecting the battery unit from impact in the event of being dropped. Referring now to the drawings, wherein the illustrations are for purposes of describing one or more embodiments and not for the purposes of limiting the same, FIG. 1 illustrates an embodiment of the string trimmer assembly 10 including an elongated support shaft assembly 12, a handle assembly 14, provided along the support shaft assembly 12, a motor assembly 16 provided generally at a distal end 18 of the support shaft assembly 12, and a protective battery housing assembly 20, provided generally at a proximal end 23 or rearward end of the support shaft assembly 12. As shown, the battery housing assembly 20 includes a bottom protective member, which may be a skid plate assembly 22, configured for removable engagement with the battery housing assembly 20.

Figure 2:
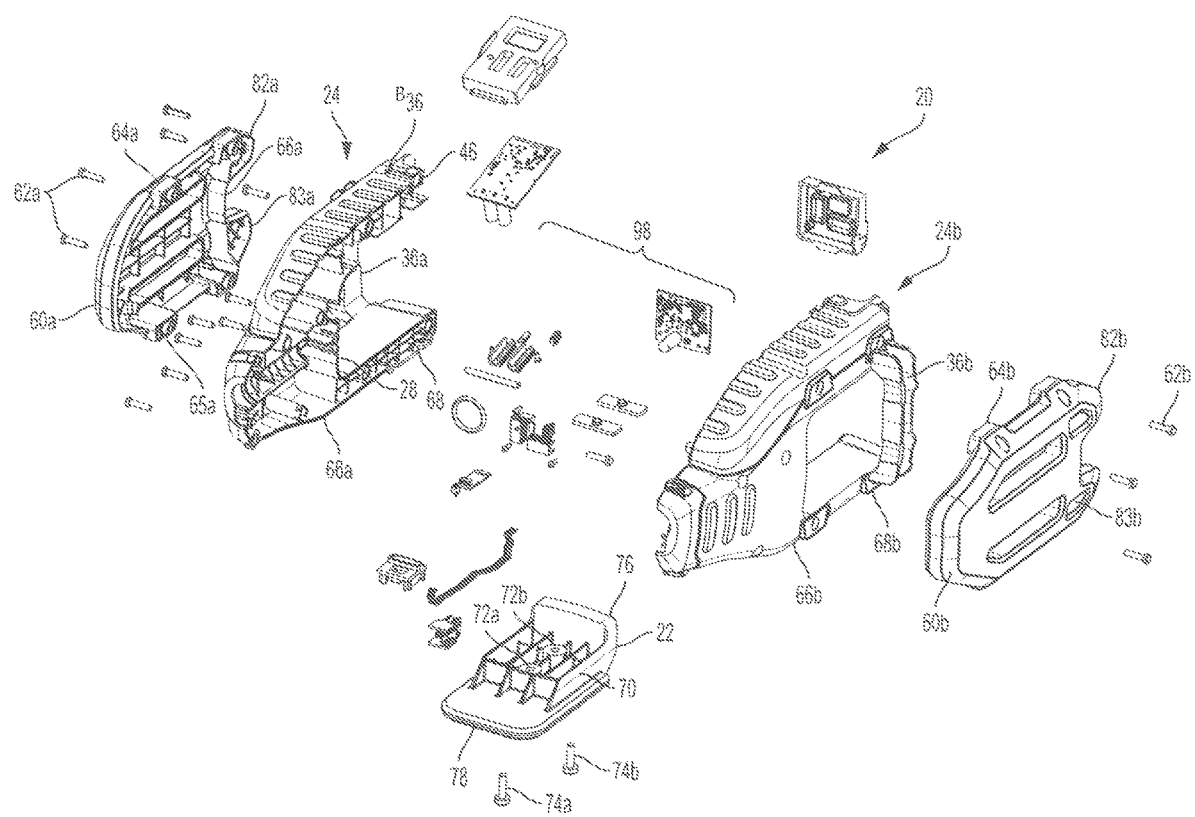
FIG. 2 is an exploded perspective view of the battery housing assembly of FIG. 1, illustrating the side members of the battery housing assembly in a unattached position.

As shown in FIG. 2, the battery housing assembly 20 generally includes as base housing member 24 comprising housing members 24a and 24b, configured for receiving the insertion of a battery 26 therein. Notably, the housing members 24a and 24b are mirror images, thus for purposes of this description, all references to features on one of the housing members are also present in the other housing member. Alternatively, the base housing member 24 may also be provided as a unitary integral structure.

Figure 3:
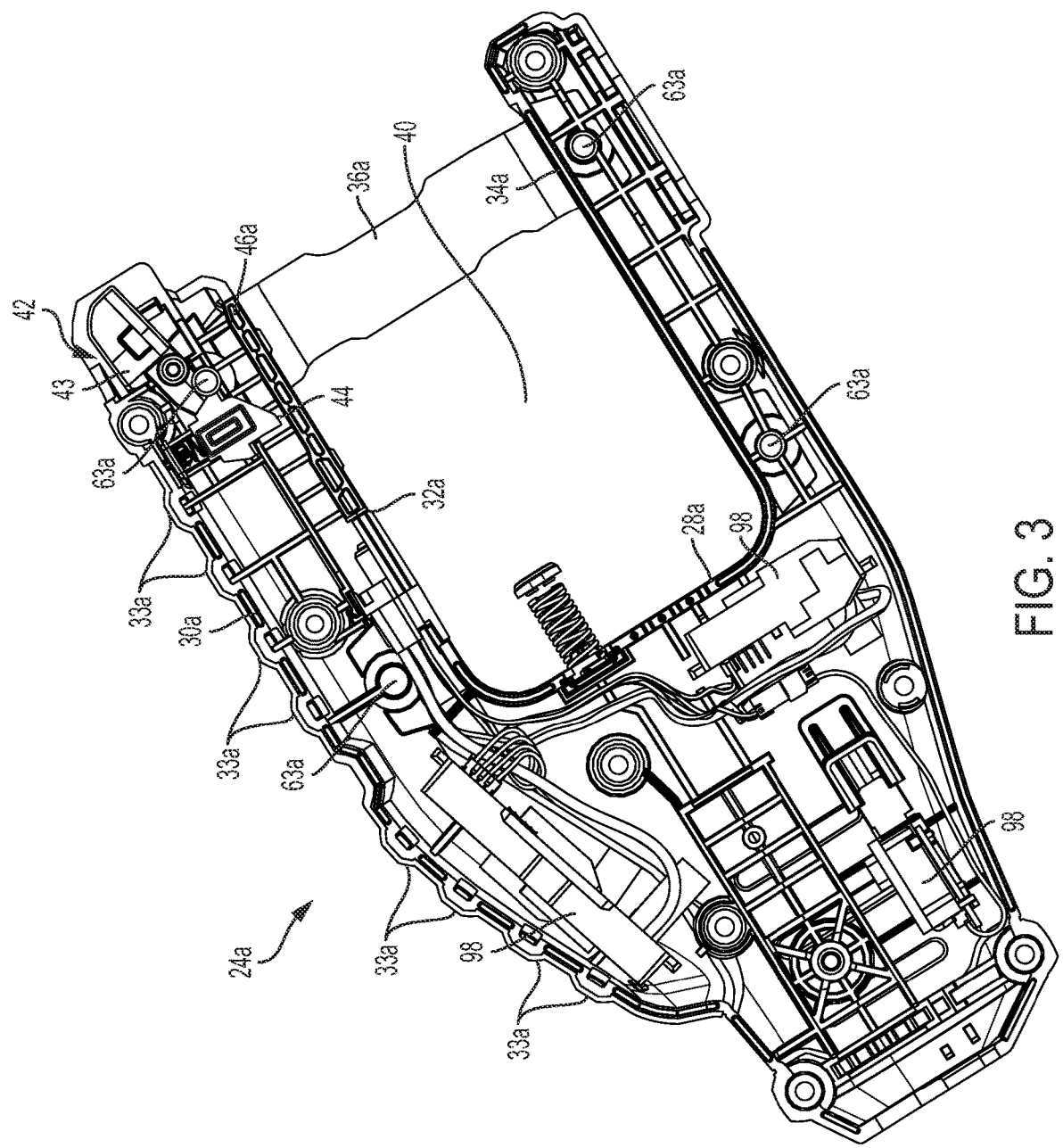
FIG. 3 is an interior sectional side view of a base housing member of the interior battery housing assembly of FIG. 1.
Figure 10:
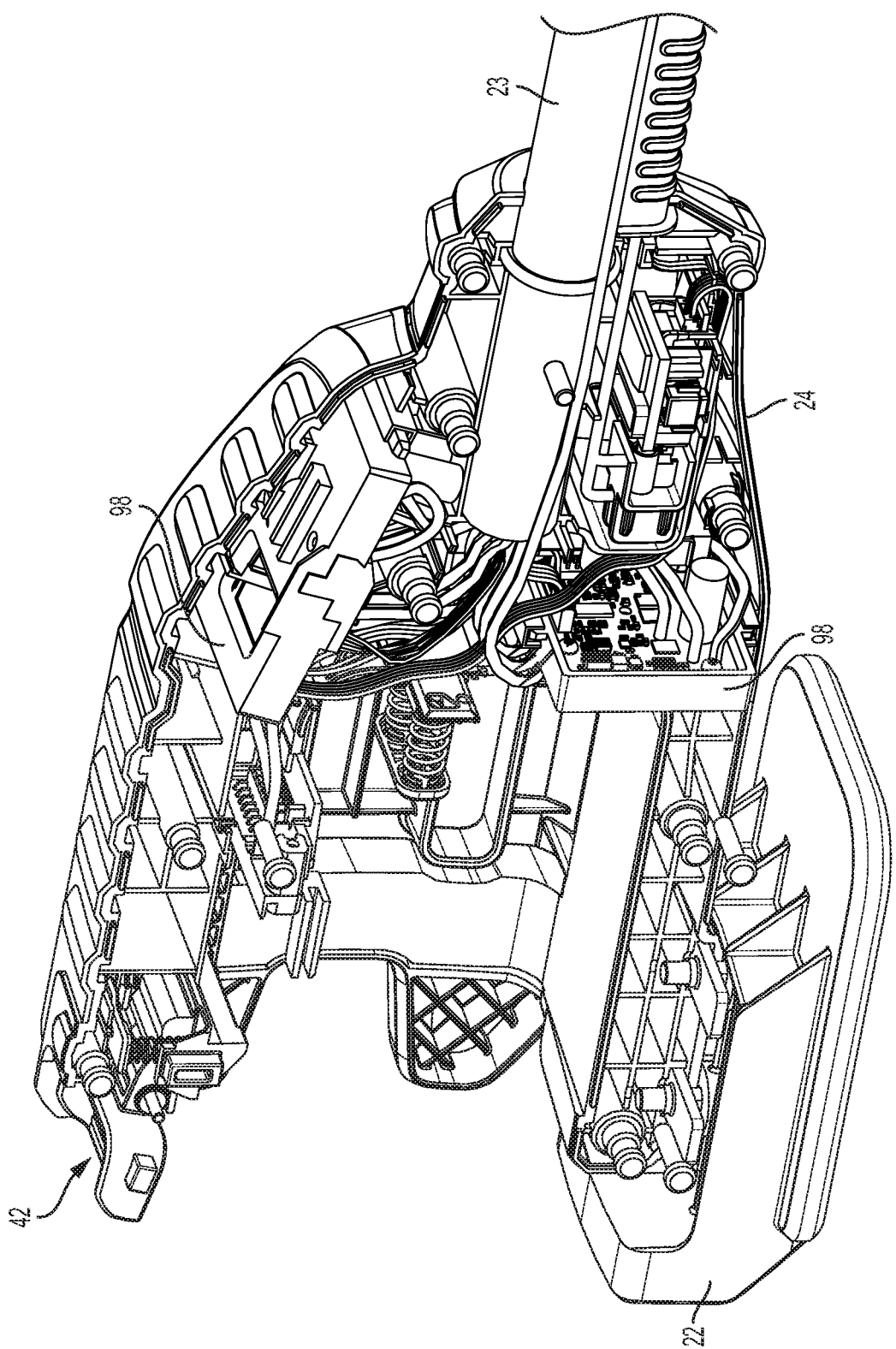
FIG. 10 is a side perspective sectional view of the battery housing assembly.

As shown in FIG. 3, the base housing member 24a generally includes a front end member 28a configured to receivably engage a frontal portion of the battery 26 in an inserted position. The base housing member 24a further includes a top member 32a, and an opposing bottom member, 34a which in cooperation define a chamber 40 configured to receive insertion of the battery 26 therein. The battery housing assembly 20 further includes a plurality of electrical components 98 provided therein to deliver power from the battery 26 to the motor assembly 16 and control operation of the string trimmer (see also FIGS. 2 and 10).

The top member 32a extends from the front end member 28a, and is configured to receivably engage a top portion of the battery 26. The bottom member 34a also extends from the front member 28a, and is configured to support a lower portion of the battery 26, when in an inserted position. As shown, the exterior portions of the bottom member 34a and top member 32a are connected by first support bracket 36a on one side of the base housing member 24a, and a second support bracket 36b, is provided on the opposite side of the base housing member 24b. Each respective support bracket 36a, 36b extends between the respective top member 32a, 32b and bottom member 34a, 34b, further defining the chamber 40 therein.

As shown, the top exterior portion 30a or armrest of the top member 32a includes a composite rubber exterior configured to provide cushioning to the user's arm during use, and further is capable of absorbing an impact if the string trimmer is dropped. The top exterior portion 30a includes a plurality of projections 33a provided along the exterior. In the event that string trimmer is dropped or impacts a surface, the projections 33a also provide for impact absorption.

Figure 9A:
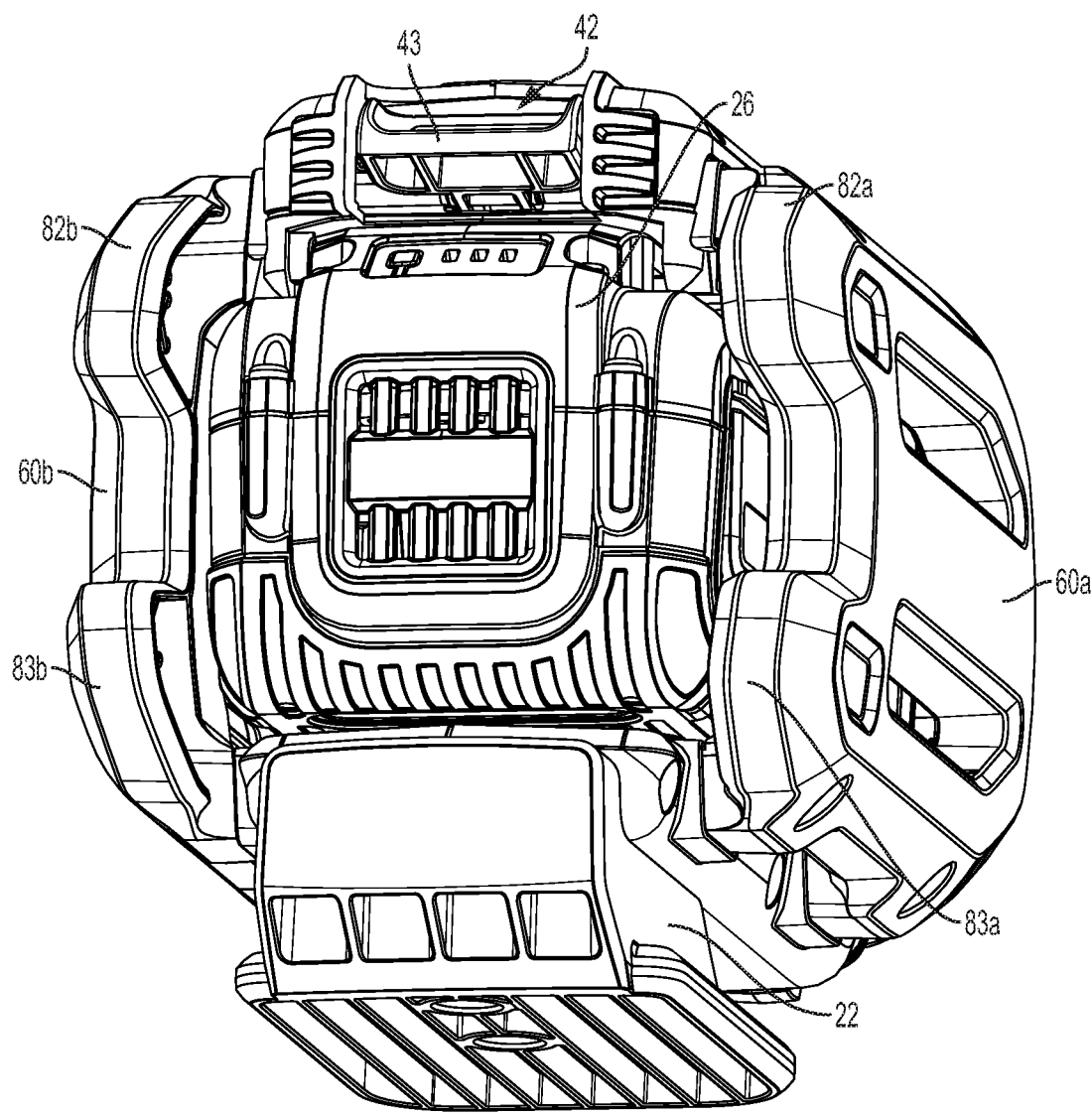
FIG. 9A is a rear perspective view of the string trimmer battery housing assembly with the battery provided therein.
Figure 9B:
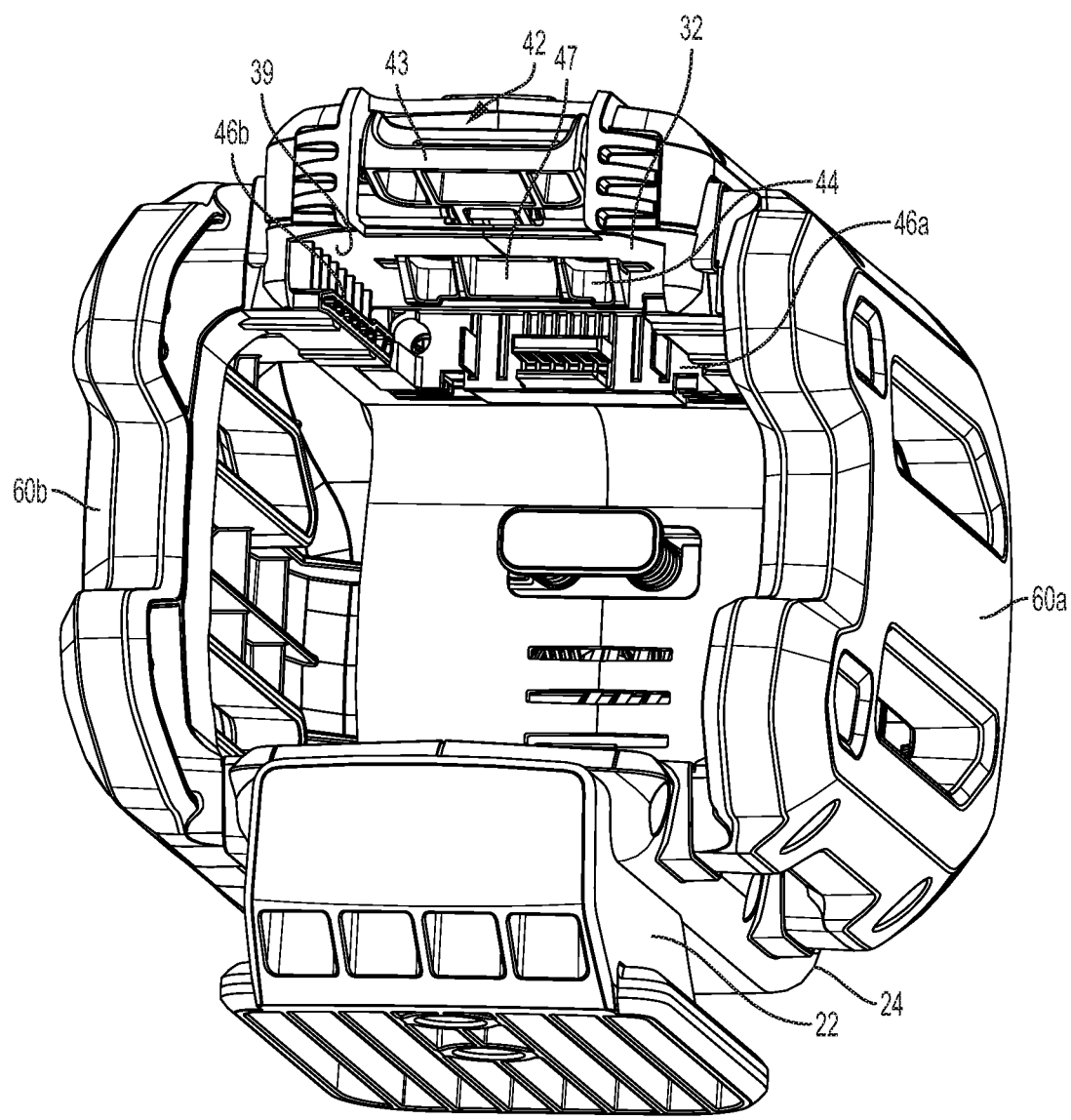
FIG. 9B is a rear perspective view of the string trimmer battery housing assembly illustrating a chamber for receiving a battery.

As shown in FIGS. 9A and 9B, an interior 39 of the top member 32 generally includes a latch assembly 42, and one or more groove members 46a, 46b, providing a space 47 configured to receive a top portion of the battery 26 therein, when the battery 26 is in an inserted portion. As shown, the latch assembly 42 is generally a spring loaded lever 43 with a detent 44, biased in a locking position.

In an inserted position, the detent 44 engages a portion of the battery 26, locking the battery 26 in the chamber 40. Groove members 46a, 46b extend along the interior top portion, providing a space to receive insertion of a rib portion of the battery 26 therein. In an inserted position, the battery 26 may be released from the chamber 40, by depressing the latch 42, thus lifting the detent 44 from an engaged position with the battery 26, to an unengaged position, and sliding the battery 26 out of the chamber 40.

Referring now to FIG. 2, the battery housing assembly 20 further includes dual side members 60a and 60b, configured to engage the base housing members 24a and 24b, forming a protective cage to for the battery 26. Notably, the side members 60a and 60b are mirror images. Accordingly, for purposes of discussion, all features disclosed on one of the side members also are present on the other side member. The side members 60a and 60b, are configured for removable connection to the outer side exterior of the base housing members 24a and 24b. As shown, the side members 60a and 60b may be removably connected to the base housing members 24a and 24b with fasteners 62a and 62b, as further shown in FIG. 2. The removable feature of the side members 60a, 60b allows a user to replace one or both of the side members 60a, 60b in the event of damage, without replacing the entire housing structure.

As further illustrated in FIGS. 2 and 3, each housing member 24a, 24b have respective openings 41a, 41b, and one or more apertures 63a, 63b formed generally about the periphery of the respective openings 41a, 41b for receiving respective fasteners 62a, 62b therein, In this example, the apertures 63a, 63b are formed generally about the four corners of the respective openings 41, 41b. Additionally, each respective side member 60a, 60b also includes one or more apertures 67a, 67b configured to receive respective fasteners 62a, 62b therein, for fastening the respective side member 60a, 60b to the respective housing member 24a, 24b.

Figure 4:
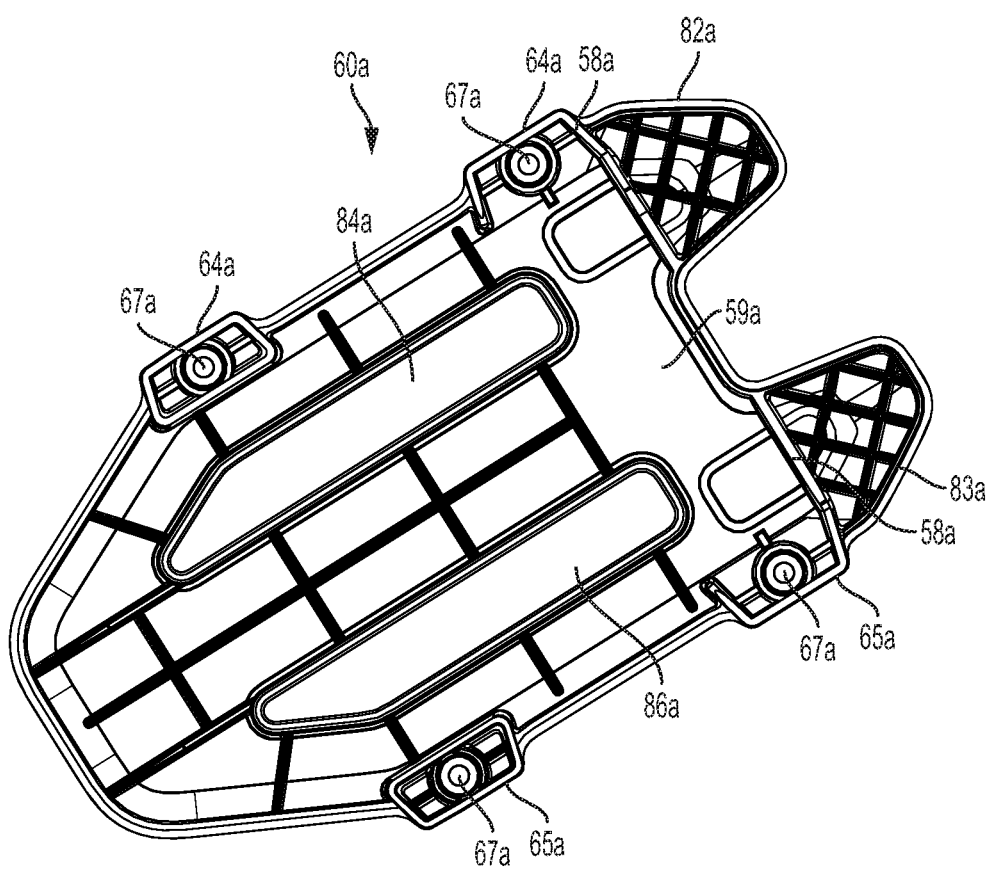
FIG. 4 is an interior side view of an exemplary side member of FIG. 2.

As further shown, each side member 60a, and 60b has an interior configured for engagement with a respective base housing member 24a and 24b. The side members 60a, 60b each include respective top foot portions 64a, 64b and a bottom foot portion 65a, 65b (not shown) extending generally inward for engagement with corresponding foot portions 69a, 71a (not shown) and 69b, 71b of the base housing members 24a, 24b. Further, each side member 60a, 60b has a respective abutment 58a and 58b (not shown), extending along the rear of the respective side members 60a, 60b, and defining a respective groove 59a (as shown in FIGS. 2 and 4) and 59b (not shown) configured to receive respective support brackets 36a, 36b of the respective base housing member 24a, 24b therein.

Figure 5:
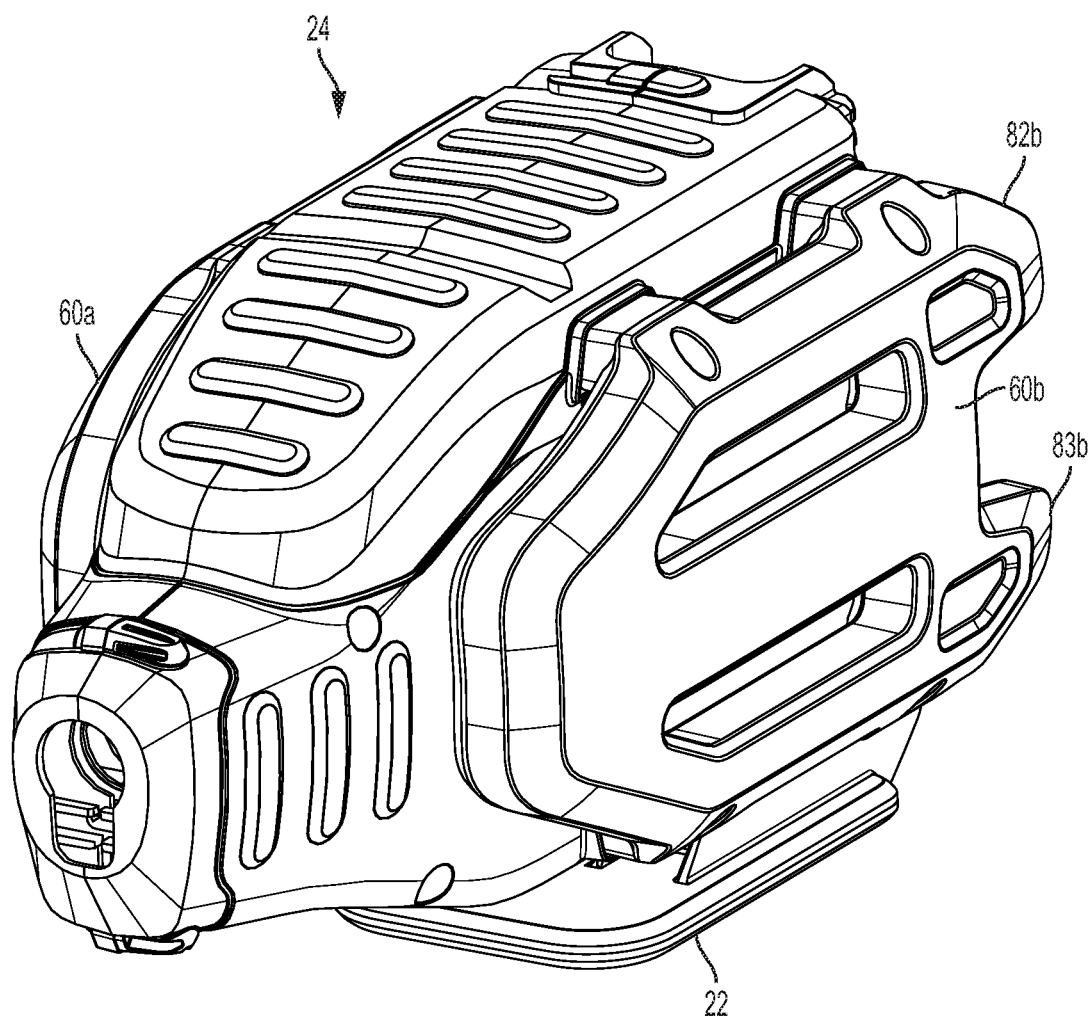
FIG. 5 is a perspective view of the battery housing assembly of FIG. 1, with the skid plate assembly attached thereto.

Further, each side member 60a, 60b has a respective first projection 82a, 82b provided at the end top portion of the respective side member 60a, 60b, and a second projection 83a, 83b provided at the end bottom portion of the side member 60a, 60b. As depicted in FIG. 5, in a connected position, the first projection 82b and second projection 83b extends beyond the outer edge of the base housing members 24b, providing protection to the rear portion of the connected battery 26.

The respective side members 60a, 60b further include one or more apertures 84, 86 formed therein. The respective apertures 84, 86 reduce the weight of the side members 60a, 60b, and further permit a user to view the battery 26, inserted therein.

As further shown in FIGS. 5-8, the skid plate assembly 22 is removably attachable to the base housing member 24. The bottom exterior portion 66 of the base housing member 24 provides a base member 68 extending therefrom. The base member 68b provides a base for receiving removable connection of the skid plate assembly 22. As shown, the skid plate assembly 22, in a connected state, forms a generally U-shaped configuration with the base housing member 24, providing a space 51 therebetween.

As shown in FIG. 2, the skid plate assembly 22 includes a first base portion 70, a second extension base portion 76 and a third mounting portion 78. The skid plate assembly 22 is comprised of a generally flexible composite plastic material conducive for absorbing an impact, such as Xenoy, for example. The first portion 70 of the skid plate assembly 22 extends generally parallel to the bottom exterior portion 66 of the base housing members 24a and 24b, permitting secure operative engagement thereto. The first portion 70 provides a base to support the base housing members 24a and 24b. The first portion 70 includes a series of apertures 72a and 72b, formed therein. The apertures 72a and 72b are configured to receive respective plural fasteners 74a and 74b, to securely fasten the skid plate assembly 22 to the bottom exterior portion 66, which is formed the combination of the housing members 24a and 24b.

The second portion 76 of the skid plate assembly 22 extends generally perpendicularly upward from the first portion 70 to operatively engage a back portion of the base housing portion 24. As such, the second portion 76, in cooperation with the second projections 83a, 83b of the respective side members 60a, 60b provide enhanced protection to the back portion of the battery 26

Figure 6:
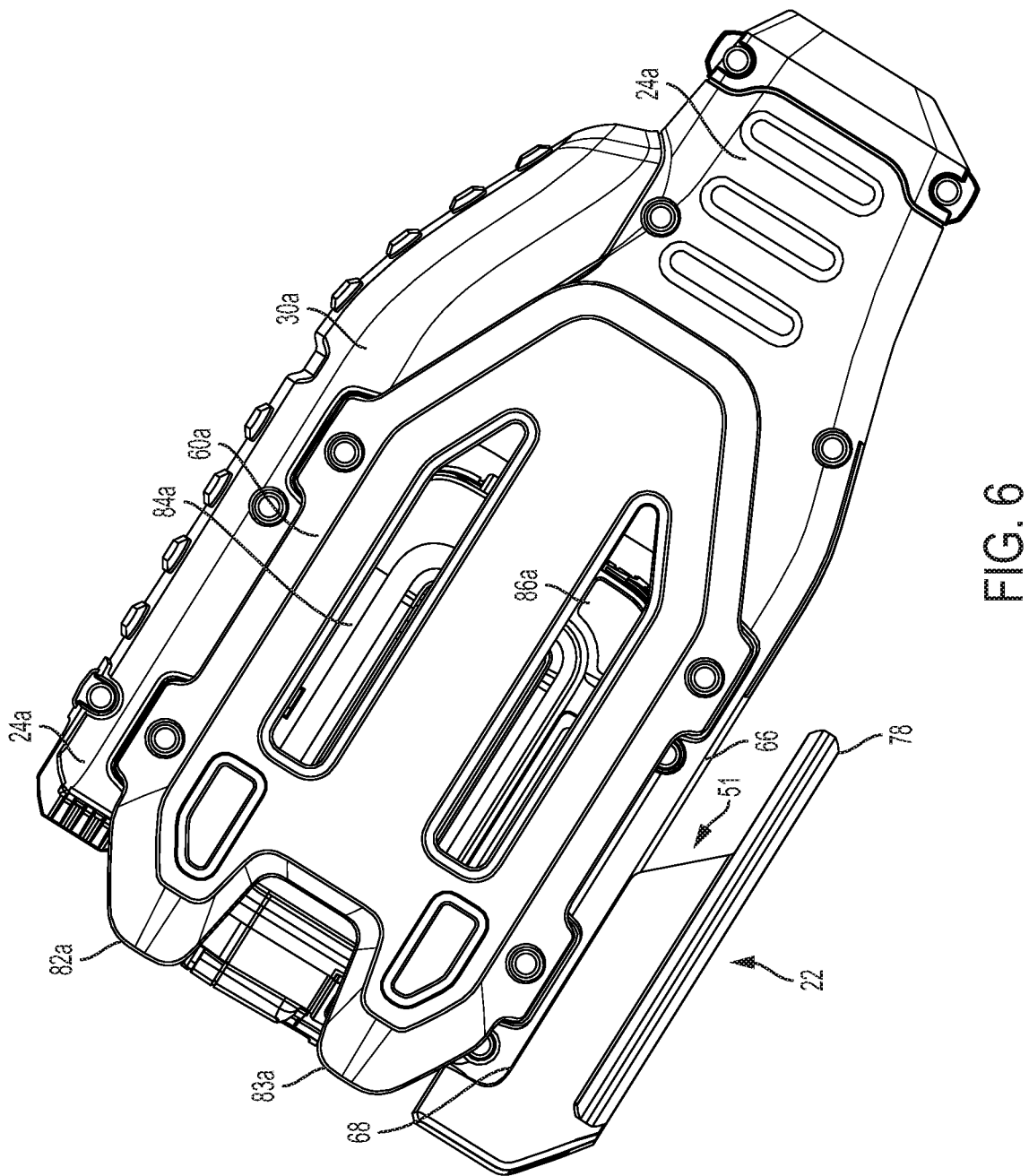
FIG. 6 is side view of the battery housing assembly of FIG. 1, with the skid plate assembly attached thereto.
Figure 7:
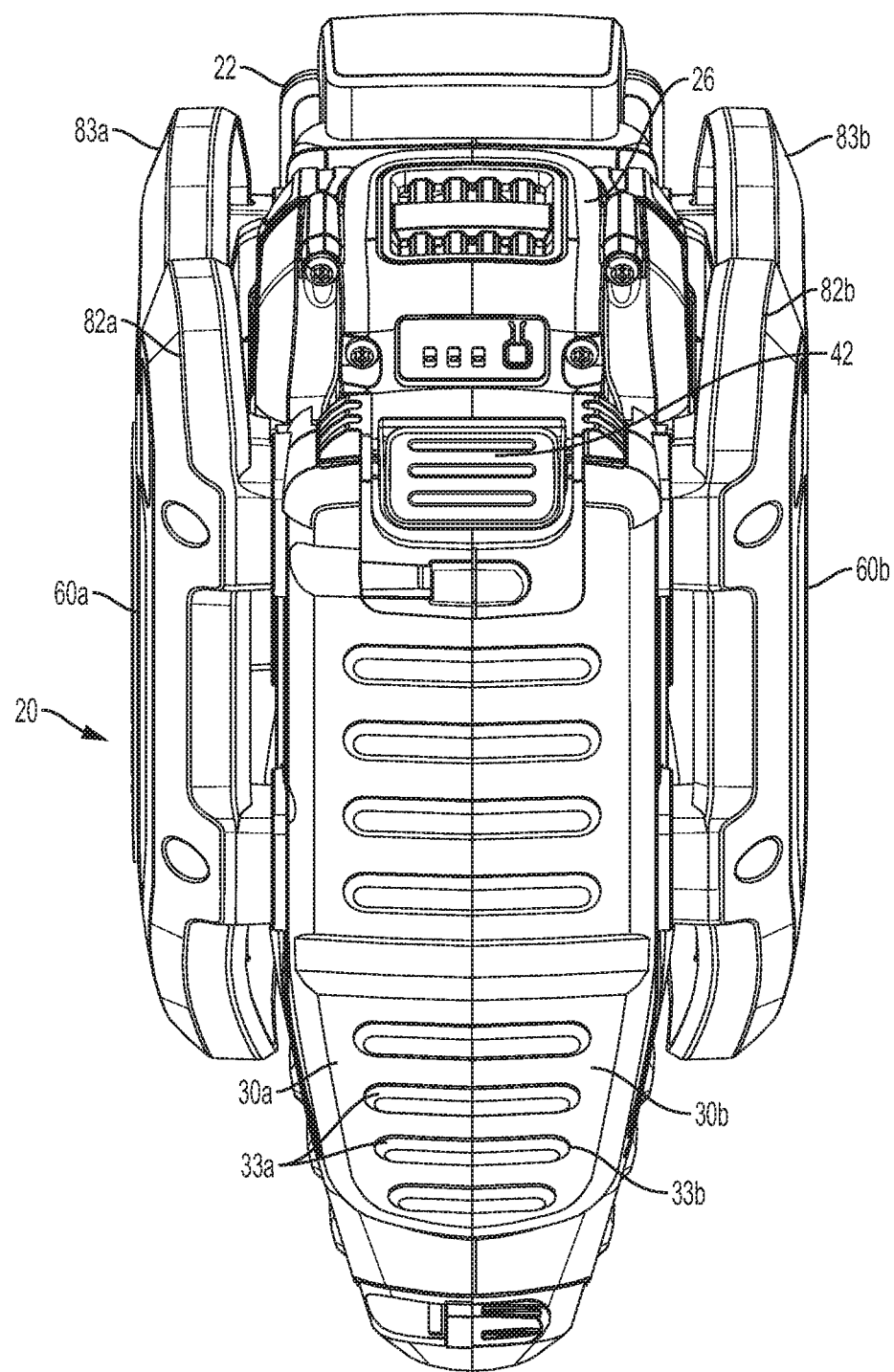
FIG. 7 is a top view of the battery housing assembly of FIG. 1.
Figure 8:
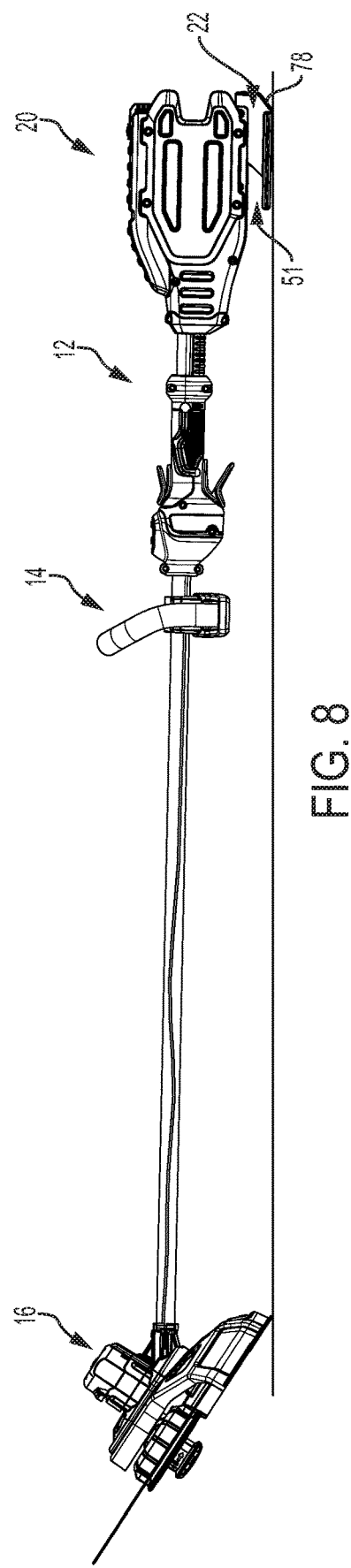
FIG. 8 is side view of the string trimmer assembly of FIG. 1, in a generally horizontally mounted position, illustrating battery housing assembly and skid plate assembly engaged with a generally flat surface.

As shown in FIG. 6, the third mounting portion 78 of the skid plate assembly 22 has a generally flat configuration, which permits the skid plate assembly 22, and the housing assembly 20 to be placed on an adjacent surface, for example the ground, as illustrated in FIG. 8. The third portion 78 of the skid plate assembly 22 extends in a generally parallel manner relative to the bottom exterior portion 66 of the base housing portion 24. As such, in a rested position, the skid plate assembly 22 engages the adjacent surface and spaces the handle assembly 14 from contact with the adjacent surface. This protects the handle assembly 14 from potential damage from the adjacent surface when the string trimmer 10 is in a rested position.

Additionally, the third portion 78 of the skid plate assembly 22 and the bottom portion 66 of the base housing portion 24 form a space 51 therebetween, permitting the string trimmer 10 to be hung vertically from the skid plate assembly 22 on a hook or upright surface.

Figure 11A:
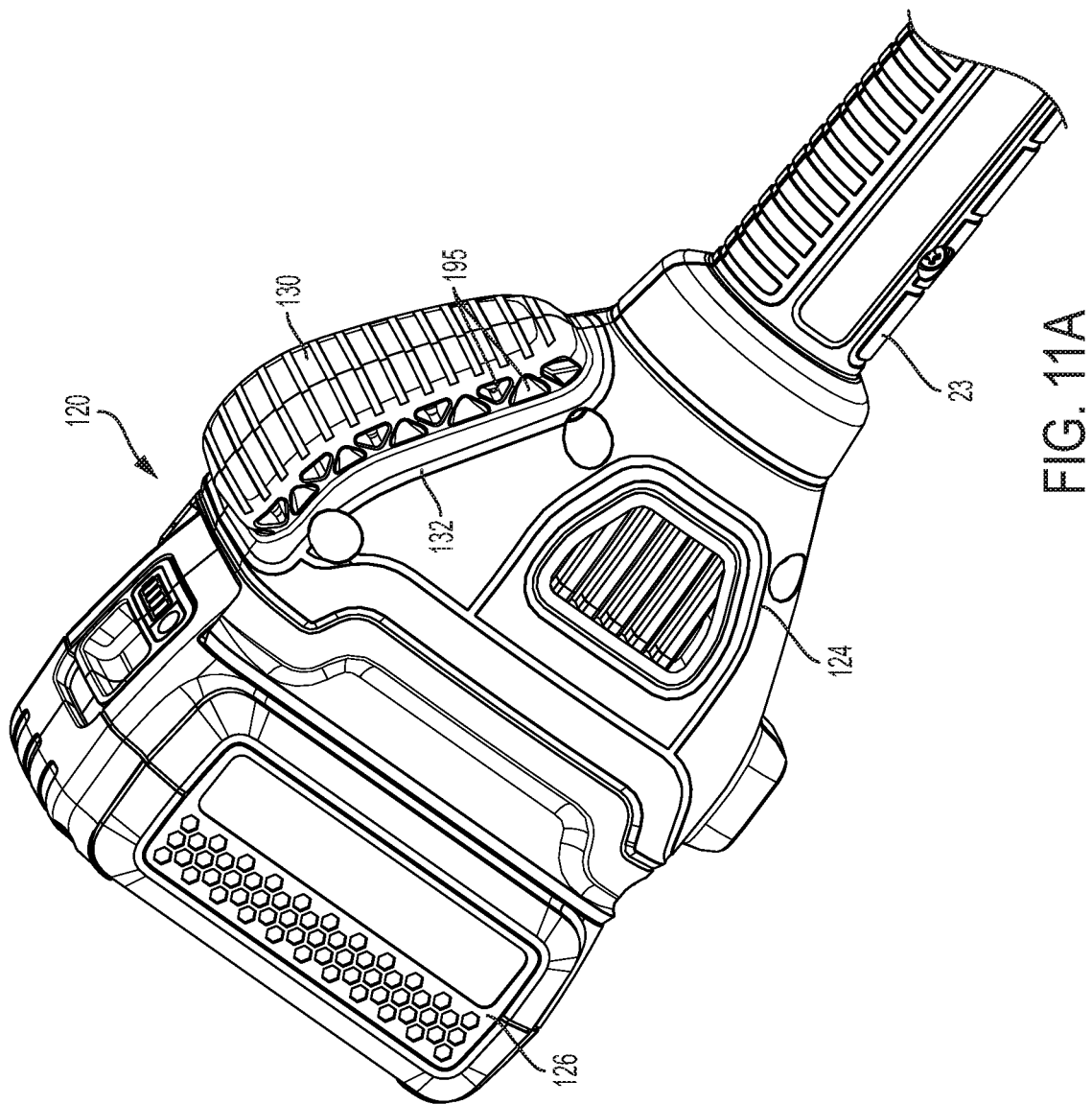
FIG. 11A is side perspective view of an embodiment of the battery housing assembly, illustrating an armrest for providing a soft feel to the user when in contact with the battery housing; and, FIG. 11B is a side sectional view of the battery housing assembly of FIG. 11A.

FIGS. 11A and 11B show an alternate embodiment of the armrest provided on the string trimmer 120, where instead of having projections, a single pad 130 is provided to permit compression when in contact with the user's arm. As illustrated the pad 130 is provided on the exterior of a top member 132 of a housing member 124. The pad is cored out with a plurality of generally hollow cushion members 195, which may have a triangular configuration. A battery 126 may be provided on the rear portion of the housing member 124.

The pad 130 is provided along the exterior portion of the top member 132 such that when a user's arm engages the pad 130, the cushion members 195 compress, absorbing contact with the user's arm, thus providing a soft feel to the user. The pad 130 may be manufactured with the housing member 124 by overmold tooling as an integral member.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A string trimmer comprising: an elongate support shaft having a cutting head assembly at a first end of the support shaft and a battery housing assembly at a second end of the support shaft; the battery housing assembly having a top member, a bottom member, a first side member and a second side member defining a chamber to receive a battery therein, the battery being received in a direction parallel to the support shaft; the bottom member having a skid plate assembly, the skid plate assembly having an extension portion and a mounting portion, the mounting portion spaced from the bottom member to create a space therebetween.

2. The string trimmer according to claim 1, wherein the mounting portion is a generally flat member that extends parallel to the bottom member.

3. The string trimmer according to claim 2, wherein the extension portion engages a rear portion of the battery housing to provide protection to the battery housing.

4. The string trimmer according to claim 1, wherein the top member includes a resilient material to provide cushioning for a user's arm.

5. The string trimmer according to claim 4, wherein the first side member and second side member are made of a resilient material to absorb impacts.

6. The string trimmer according to claim 5, wherein the battery housing assembly includes projections extending rearwardly so as to extend beyond and protect the battery received therein.

7. The string trimmer according to claim 1, further comprising a guard assembly on the cutting head and a handle assembly, wherein the guard assembly and the skid plate assembly when resting on a flat surface contact the flat surface so that the handle assembly does not contact the flat surface.

8. A string trimmer comprising: an elongate support shaft having a cutting head assembly at a first end of the support shaft and a battery housing assembly at a second end of the support shaft; the battery housing assembly having a top member, a bottom member, a first side member and a second side member defining a chamber to receive a battery therein;
the bottom member having a skid plate assembly, the skid plate assembly having an extension portion and a mounting portion to form a generally U-shaped structure with the bottom member, the mounting portion spaced from the bottom member to create a space therebetween that is open in a forward direction allowing the skid plate assembly to be used to hang the string trimmer.

9. The string trimmer according to claim 8, wherein the extension portion engages a rear portion of the battery housing to provide protection to the battery housing.

10. The string trimmer according to claim 8, wherein the top member includes a resilient material to provide cushioning for a user's arm.

11. The string trimmer according to claim 10, wherein the first side member and second side member are made of a resilient material to absorb impacts.

12. The string trimmer according to claim 8, wherein the battery housing assembly includes projections extending rearwardly so as to extend beyond and protect the battery received therein.

13. A battery housing for a string trimmer comprising: a battery housing assembly having a top member, a bottom member, a first side member and a second side member defining a chamber to receive a battery therein, the battery housing being adapted to positioned at one end of a support shaft, the battery being received in the battery housing in a direction parallel to the support shaft; wherein at least two of the top member, the bottom member, the first side member and the second side member have a projection extending rearwardly from the battery housing to protect the battery from impact and further comprising a skid plate assembly on a bottom member of the housing, the skid plate assembly having an extension portion and a mounting portion to form a generally U-shaped structure with the bottom member, the mounting portion spaced from the bottom member to create a space therebetween that is open in a forward direction allowing the skid plate assembly to be used to hang the string trimmer.

14. The battery housing according to claim 13, wherein the at least two member having projections are on opposite sides of the battery housing.

* * * * *